3,591,541
EMULSION POLYMERIZATION USING MODIFIED CARBOXYLIC EMULSIFIERS
Robert D. Athey, 100 Kings Highway, Milford, Del. 19963, and Emil G. Sammak, 515 Westwood Drive, and Edward Witt, 567 Westwood Drive, both of Dover, Del. 19901
No Drawing. Filed Sept. 25, 1967, Ser. No. 670,406
Int. Cl. C08d *1/09;* C08f *15/40*
U.S. Cl. 260—23.7                                  25 Claims

ABSTRACT OF THE DISCLOSURE

A polymerization system for producing unique stable latices containing a substantial proportion of bound alkaline sensitive groups which comprises an aqueous emulsion containing a carboxylic emulsifier modified by the presence of a noncationic hydrophilic group in its hydrocarbon chain, e.g., cocoyl sarcosine, and polymerizable monomeric material containing alkaline sensitive groups, e.g., a mixture of butadiene, styrene and itaconic acid or methylol acrylamide, at a pH in a range from acid to substantially neutral. This system (1) supports emulsion polymerization even in low-shear large capacity reactors without the occurrence of excessive prefloc deposition of the resulting polymeric solids, (2) gives reproducible polymerization rates and (3) produces stable latices of useful viscosity having high solids content.

The process for producing the unique stable latices includes effecting polymerization of the polymerizable monomeric material containing alkaline sensitive groups in an aqueous emulsion containing the modified carboxylic emulsifier and having a pH in a range from acid to substantially neutral, e.g., 2 to 6, at temperatures from about 0° C. to about 100° C., and thereafter recovering the resulting latex from the unreacted monomers.

---

This invention relates to improved emulsion polymerization of monomeric materials containing carboxyl and/or other alkaline sensitive groups and to the unique latices or aqueous dispersions of polymers produced by such polymerization. In particular, this invention relates to a system and process for polymerization of monomers containing carboxyl groups and/or other alkaline sensitive groups in an aqueous emulsion containing modified carboxylic emulsifiers and to the resulting unique latices.

Heretofore, it has been the practice to employ carboxylic emulsifiers as emulsion stabilizers and in supporting polymerizations only at high pH levels, i.e., usually about a pH of 9 or more. Latices produced from monomers containing carboxyl groups and particularly those aqueous dispersions of carboxyl-containing polymers having a substantial proportion of bound acid, i.e., pendant carboxylic acid groups within the polymer chain, are not produced by emulsion polymerization at such high pH levels. Thus, it has been generally accepted that latices prepared from unsaturated monomers containing carboxyl groups and the like alkaline sensitive groups had to be made in aqueous systems containing nonionic emulsifiers or with sulfonate or other anionic emulsifiers that are soluble at low pH, i.e., 7 or below. Use of these emulsifiers, however, produces latices which are often difficult to coagulate in subsequent operations, or which have unmanageable viscosity when taken to the solids content required for many latex applications.

The polymerization systems disclosed in the copending application of Edward Witt Ser. No. 536,222 filed on Jan. 19, 1966, now U.S. Pat. 3,480,578, overcome many of the above-enumerated shortcomings of the prior art in the production of unique latices from monomers containing alkaline sensitive groups by the use of certain carboxylic emulsifiers (e.g., oleic acid, potassium acid oleate and the like) in an acid or substantially neutral aqueous system. These polymerization systems are particularly effective in small scale laboratory apparatus. However, such systems present some problems when employed in large commercial-size apparatus. In particular, it has been found that use of such carboxylic emulsifiers at low pH causes poor emulsification, which incurs stratification of the monomer in the polymerization system within large scale commercial apparatus that is usually equipped with low shear rate agitators to minimize coagulation of the latex. In addition, excessive prefloc deposition or precoagulation of polymeric solids from the newly formed latex often occurs in such large capacity reactors.

Advantageously, the improved polymerization systems of this invention substantially eliminate the occurrence of excessive prefloc deposition in large scale equipment, and also produce latices similar to those obtained by the systems disclosed in the copending application of Edward Witt, e.g., latices which have workable viscosities at a solids content higher than that of the latices produced by the nonionic or sulfonate-type anionic emulsifiers heretofore employed.

Thus, this invention contemplates production of unique carboxyl-containing polymers in the form of latices by effecting emulsion polymerization of olefinically unsaturated monomers containing carboxyl groups and/or other such alkaline sensitive groups with aliphatic conjugated dienes in an aqueous system which contains carboxylic emulsifiers, modified with certain non-cationic hydrophilic groups and which has a pH that may range from acidic to substantially neutral without excessive prefloc deposition of polymeric solids in large capacity reactors.

The term "alkaline sensitive groups" as used herein, refers to those groups which are unstable or are converted to other groups under alkaline conditions. For example, carboxyl groups (—COOH) are neutralized in an alkaline solution. Thus, emulsion polymerization of monomers containing such groups in an alkaline medium will fail to produce polymers having a substantial proportion of the original alkaline sensitive groups pendant from the polymer chain. In other cases, such as the use of monomeric mixtures containing alkylol acrylamides, polymerization is substantially inhibited at high pH.

The term "carboxyl-containing" refers to a monomer or monomeric mixture containing at least one monomer having one or more pendant carboxylic acid groups (—COOH) a portion of which may be ionized to the anionic form. The relative proportions of the free acid and anionic form are, of course, determined by pH-regulated equilibria. The term "non-carboxylic" means the monomer is devoid of carboxylic acid groups and anions formed therefrom.

One aspect of this invention is directed to an aqueous emulsion system for polymerization of monomers having alkaline sensitive groups that contains a modified carboxylic emulsifier, such as fatty acids containing non-cationic hydrophilic groups, as the primary emulsifier with or without an auxiliary emulsifier and having a pH in the vicinity of 7 or lower in a large capacity reactor, e.g., a multi-gallon vessel. Another aspect of this invention is concerned with a process for producing unique latices by effecting polymerization of a monomer having alkaline sensitive groups in an aqueous emulsion system which contains the modified carboxylic emulsifier at a pH in the vicinity of 7 or lower without stratification of the monomers and excessive prefloc deposition of polymeric solids.

Still another aspect of the invention is directed to the unique latices of elastomeric copolymers containing alkaline sensitive groups which have a wide and easily adjustable range of stability and which produce deposited coatings, layers, films and the like that are suitable for many different applications. By adjusting the pH, these latices can be quite readily destabilized, e.g., coagulated.

In accordance with this invention it has been found that unique carboxylic latices or aqueous dispersions of polymers having a substantial proportion of bound acid, i.e., pendant carboxylic acid groups in the polymer chain, can be prepared by effecting emulsion polymerization of a monomeric mixture containing at least one carboxyl-containing unsaturated monomer, at least one aliphatic conjugated diene and preferably one or more other copolymerizable non-carboxylic ethylenically unsaturated monomers in an acidic or nearly neutral aqueous system containing a carboxylic emulsifier modified by the presence of certain non-cationic hydrophilic divalent groups which interrupt or append to the hydrocarbon chain of the emulsifier. That is, the hydrophilic non-cationic groups are attached to the hydrocarbon chain near the carboxyl group, preferably in the alpha through delta position. Furthermore, it has been found that the addition of small concentrations of auxiliary emulsifiers or dispersants advantageously increases the rate of polymerization of such carboxyl-containing monomeric mixtures.

The carboxyl-containing monomers that can be used to prepare the unique carboxylic latices of this invention include a variety of unsaturated monocarboxylic and polycarboxylic acids and the partial esters of the polycarboxylic acids. In general, suitable acids are characterized by possessing one or more olefinic carbon-to-carbon double bonds and one or more carboxyl groups in which at least one of the olefinic carbon-to-carbon double bonds are activated, as is understood in the polymerization art, to render the acid copolymerizable with the diene and the non-carboxylic monoolefinic monomer.

Suitable carboxyl-containing monomers are represented by the following formula:

(I)

in which R is preferably hydrogen or carboxyl, but may be carboxylic ester, alkyl or alkenyl, Y is hydrogen, carboxyl, carboxylic ester, halogen, cyano, sulfo, alkyl, aryl, thienyl or furyl Z is a methylene or a substituted methylene group, or an allyl, arylene, thienlyene or furylene divalent radical, $n$ is zero or any whole number, suitably not exceeding 3, and in which at least one of the groups R and Y is carboxyl or Z is carboxyl-containing. Representative examples of the monocarboxylic acids designated by the above formula include acrylic and substituted acrylic acid and other copolymerizable ethylenically unsaturated monocarboxylic acids, such as crotonic acid, alpha-chlorocrotonic acid, hydrosorbic acid, cinnamic acid, m-chlorocinnamic acid, p-chlorocinnamic acid, acrylic aid, alpha-chloroacrylic acid, methacrylic acid, ethacrylic acid, vinyl thiophenic acid, alphafuryl acrylic acid, vinyl furoic acid, p-vinylbenzoic acid, vinylnaphthoic acid, alpha-isopropenyl acrylic acid, alpha-styryl acrylic acid, 2-carboxy-4-phenyl-1,3-butadiene, sorbic acid acid, alpha-methyl sorbic acid, alpha-ethyl sorbic acid, alpha-chloro sorbic acid, alpha-bromo sorbic acid, beta-chloro sorbic acid, alpha-, beta-, or gamma-epsilon-dimethyl sorbic acid, 2,4-heptadienoic acid, 2,4-hexadienoic acid, 2,4-pentadienoic acid, and alpha- and beta-vinyl acrylic acids.

In addition, such monomers include olefinically unsaturated polycarboxylic acids such as fumaric, maleic, citraconic, mesaconic, itaconic, aconitic, ethyl maleic acid, methyl itaconic, muconic, hydromuconic, glutaconic; 2-carboxypenta-diene-(2,4)-oic-1, beta-(p-carboxyphenyl) acrylic, 2,4-pentadiendioic-1,3 acid, the dimer and trimer of methacrylic acid and other monoolefinic and polyolefinic polycarboxylic acids, the monoolefinic acids being preferred for many applications of the unique carboxylic latices. The utilization of these copolymerizable polybasic acids or their anhydrides which are readily hydrolyzed in the acidic polymerization provides a means for direct introduction of the polycarboxylic acid groups into the polymer chain.

The partial esters of unsaturated polycarboxylic acids employed in this invention may be prepared from unsaturated carboxylic acids having two or more carboxyl groups or the anhydrides thereof. It will be understood that the expression "partial ester of an unsaturated polycarboxylic acid" refers to those compounds in which at least one carboxyl group is esterified and at least one further carboxyl group is unreacted. As noted above, examples of unsaturated polycarboxylic acids include fumaric, maleic, glutaconic, citraconic, itaconic, mesaconic, aconitic, and the like, with fumaric, maleic, and itaconic acids being particularly preferred for the purposes of preparing partial esters. Although many compounds containing hydroxyl groups may be considered as alcohol components useful to esterify at lease one of the carboxyl groups in the polycarboxylic acids the aliphatic saturated and unsaturated alcohols containing from 1 to about 20 carbon atoms, and preferably from 1 to 10 carbon atoms have been found to be the most preferred.

Preferably, the partial esters employed are the "half esters" or monoesters prepared from unsaturated acids containing two carboxylic groups. These monoesters of dibasic acids have the structural formula:

(II)

wherein X represents the acid residue of a dibasic acid having from 4 to 8 carbon atoms, and preferably from 4 to 5 carbon atoms and R' represents an alkyl, aryl, alkylaryl, aralkyl, cyclo-aliphatic group, or halogen-, acyloxy-, or alkoxy-substituted derivative thereof containing from about 1 to 15 carbon atoms, and with the alkyl groups containing from 1 to 8 carbon atoms being most preferred radicals, and wherein the R' group may be substituted on either of the carboxylic groups of the acid residue.

Exemplary of the moieties represented by R' in the above formula are: methyl, ethyl, propyl, isopropyl, butyl, isobutyl, sec-butyl, t-butyl, amyl, hexyl, decyl, chloromethyl, chloro-ethyl, cyclohexyl, methyl-cyclohexyl, dimethyl-cyclopentyl, amyl-cyclopentyl, methyl-cyclohexyl, dimethyl-cyclohexyl, phenyl, chloro-phenyl, zenyl, naphthyl, tolyl, xylyl, ethyl-phenyl, propyl-phenyl, isopropyl-phenyl, benzyl, acetoxy-ethyl, chlorophenoxy-ethyl, methoxy-propyl, and the like.

The aliphatic conjugated dienes suitable for preparing carboxylic latices include the butadiene-1,3 hydrocarbons such as butadiene-1,3 itself; 2-methyl butadiene-1,3 (isoprene); 2,3 - dimethylbutadiene - 1,3; piperylene; 2 - neopentyl butadiene-1,3; and other hydrocarbon homologs of butadiene-1,3. In addition, the substituted dienes, such as 2-chloro butadiene-1,3; 2-cyano butadiene-1,3; the straight chain conjugated pentadienes; the straight chain and branched chain conjugated hexadienes, and the like, are found suitable. In general, dienes containing more tha 10 carbon atoms polymerize very slowly, if at all, in the present polymerization systems; consequently, it is preferred to employ a diene having ten carbon atoms or less. Dienes having from 4 to 6 carbon atoms have particularly advantageous reaction rates and polymerization characteristics and, therefore, are preferred. The butadiene-1,3 hydrocarbons, and butadiene-1,3, in particular, are preferred.

In accordance with this invention a monomer mixture to be polymerized may contain one or more copolymerizable noncarboxylic ethylenically unsaturated monomers in addition to the dienes. These monomers which are preferably monoolefinic monomers and which together with the aliphatic conjugated diene constitute a major portion of the monomeric mixture for preparing the preferred copolymers, may be any one of a number of monomers and preferably those copolymerizable with the dienes. Such monoolefinic monomers are well known in the art and are indicated by typical monomers set forth below. In particular, the monoolefinic monomer is characterized as one which contains an activated carbon-to-carbon double bond, that is, a monomer containing an olefinic double bond which readily functions in an addition polymerization reaction because of the olefinic double bond being present in the monomer molecule either in the alpha-beta position with respect to a stronger polar or functional group, such as nitrile, carboxylic ester, halogen, keto, amide, and other such groups well known in the art as activating groups, or because it is adjacent to a terminal methylene group, that is, $CH_2=C<$. Among the monoolefinic monomers copolymerizable with the carboxyl-containing monomers in aqueous dispersion and characterized by the presence of such groups are the aliphatic unsaturated nitriles, such as acrylonitrile, alphachloro-acrylonitrile, methacrylonitrile, ethacrylonitrile; the alcohol esters of acrylic and substituted acrylic acids, such as methyl methacrylate, methyl acrylate, methyl ethacrylate, butyl methacrylate, isobutyl dichloro acrylate, and other acrylic esters of alcohols, preferably having one to six carbon atoms; styrenes, such as styrene itself, halo, cyano, alkyl, aryl, and other substituted styrenes, for example vinyl toluene, alpha methyl styrene, alpha chloro styrene, p-cyano styrene, p-phenyl styrene; other polymerizable vinyl compounds such as vinyl naphthalene, vinyl pyridine, vinyl ethers and ketones; and other compounds such as vinylidene chloride.

When preparing carboxyl-containing diene copolymers, it is preferred to employ copolymerizable monolefinic monomers selected from the group consisting of nitriles, styrenes, and the alcohol esters of acrylic and alpha-substituted acrylic acids.

The amount of carboxyl-containing unsaturated monomers, aliphatic dienes and non-carboxylic ethylenically unsaturated monomers used to prepare the carboxylic latices of this invention may vary within very wide limits. In general, monomeric mixtures contain from about 10 percent to 90 percent by weight of a conjugated diene, and from about 10 percent to about 75 percent by weight of one or more of the non-carboxylic ethylenically unsaturated monomers, with the combined weight of these two monomeric materials usually constituting the major portion of the total monomeric mixture. The carboxyl-containing unsaturated monomer which is the essential part of the monomeric mixture constitutes a minor proportion of the monomeric charge and usually it may be present in amounts from as low as about 0.5% up to any minor proportion that is less than half of the total monomer charge.

Preferably the carboxyl-containing monomer constitutes from about 0.5% to 20% by weight of the monomer charge. If it is a polycarboxylic acid, no more than 5% by weight of the monomer charge is usually employed.

The modified carboxylic emulsifiers suitable for the purpose of this invention include modified fatty acids, modified rosin acids, and derivatives thereof which have at least one non-cationic hydrophilic group in their hydrocarbon chains, the number and type of hydrophilic groups being selected so that the emulsifier is substantially water insoluble within the acid pH range chosen for the polymerization. In general, these carboxylic emulsifiers contain from about 8 to about 40 carbon atoms per molecule, have at least one carboxylic acid group, and may be derived from straight or branched chain aliphatic or alicyclic compounds.

These modified carboxylic emulsifiers may be represented by the following general formula:

$$R_1-(A)-R_2-[COOH]_m \qquad (III)$$

wherein $R_1$ is an alkyl, alkaryl, or aralkyl group containing from 8 to 36 carbon atoms and preferably from 9 to 18 carbon atoms, A is a non-cationic, hydrophilic group or radical, $R_2$ is an unsubstituted cycloalkylene or arylene group or a $C_{1-4}$ alkylene group, which may be linear or branched, or a trivalent hydrocarbyl group derived from the cycloalkylene, arylene or $C_{1-4}$ alkylene group and $m$ is 1 or 2; $R_2$ being a trivalent hydrocarbyl group when $m$ is 2.

Exemplary of the suitable fatty acids and rosin acids which may be modified by the presence of non-cationic hydrophilic groups are capric, undecyclic, lauric, myristic, palmitic, stearic, oleic, linoleic, arachidic, hydrogenated abietic acid, disproportionated abietic acid, pimaric, coconut, tall oil, and the like.

The non-cationic, hydrophilic groups represented by A in Formula III above are further characterized as non-basic, divalent radicals that are non-reactive under the polymerization conditions which produce the unique latices of the invention. These hydrophilic groups include oxy, thio, amido alkyl, carbamyl, and β and higher keto groups as well as alkylene-type linkages containing hydroxy, siloxy, carboxy, nitrile, aldehyde and nitro substituent groups.

The modified carboxylic emulsifiers encompassed by Formula III thus include a number of surface-active materials which are further exemplified by the following general formulas:

ETHERS $$R_1-O-R_2-COOH \qquad (IV)$$

AMIDES

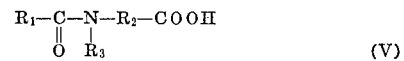
(V)

or

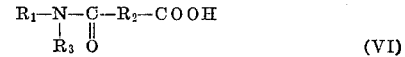
(VI)

or

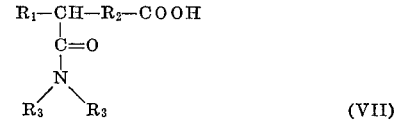
(VII)

CARBAMYL-CONTAINING

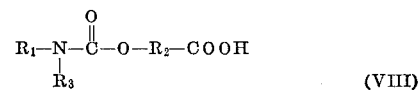
(VIII)

or

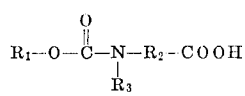

ESTERS

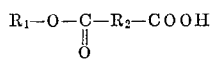

or

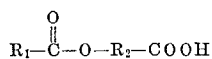

HYDROXY-CONTAINING

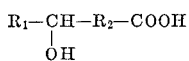

CARBOXY-CONTAINING

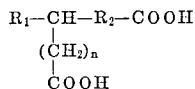

KETO-CONTAINING

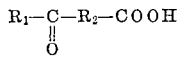

ALDEHYDE-CONTAINING

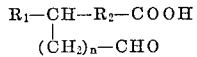

NITRILE-CONTAINING

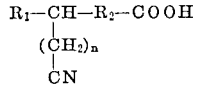

and

NITRO-CONTAINING

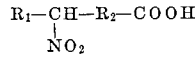

wherein $R_1$ and $R_2$ are hydrocarbon radicals as defined above for Formula III, $n$ is an integer from 1 to 4, and $R_3$ is hydrogen or an alkyl or an alkaryl group containing from 1 to 20 carbon atoms.

The ethers, the amides and the polycarboxylic emulsifiers exemplified by Formulas IV, V, VI, VII and XIII respectively, have been found to be particularly effective emulsifiers. The preferred modified carboxylic emulsifiers of this invention are the fatty acids having their hydrocarbon chains interrupted by amido alkyl groups and are illustrated by the amides exemplified by Formulas V and VI above.

Exemplary of the particularly effective emulsifiers are lauroyl sarcosine, cocoyl sarcosine, oleoyl sarcosine, oleoyl-lineoleoyl sarcosines, stearoyl sarcosine, dodecyl phenoxy acetic acid, nonyl phenoxy acetic acid, dodecenyl succinic acid, dodecenyl succinic anhydride, dodecenyl succinamide and monoesters of dedecenyl succinic acid and the like.

Suitable carboxylic acid derivatives include the fixed and volatile-base soaps. The fixed soaps are the alkali soaps prepared from the above described modified acids and such alkaline bases as the alkali metals and the higher boiling amines such as tripropylamine, the secondary and tertiary butyl, amyl, and hexylamines and the like which usually boil above 160° C. It will be appreciated that the expression "alkali soaps" refers to those soaps or salts prepared by reaction with an alkali metal, or amine. The volatile-base soaps are the soaps or salts of the above-described acids and volatile alkalis. Exemplary of the volatile-bases that may be used to form volatile soaps are ammonia and amines such as methylamine, ethylamine, dimethylamine, diethylamine, triethyl-amine, propylamine, dipropylamine, isopropylamine, diisopropylamine, butyl primary amines, amyl primary amines, hexyl primary amines, cyclohexylamine, piperidine, 1-methylpiperidine, 2-picoline, morpholine and the like, as well as mixed amines such as methyl ethylamine, methylpropylamine, methyl butylamine, methyl diethylamine and the like.

The voltatile alkali soaps, especially the ammonium soaps of the amides, are the most preferred emulsifiers because they are less sensitive to variations in the pH of the polymerization system. It will be appreciated that at the acid pH employed in the emulsion system of this invention, many of the modified fatty acids, the modified rosin acids or mixtures thereof will be in the form of partial soaps or salts.

In accordance with this invention the amount of modified carboxylic emulsifier used in the aqueous emulsion system may be varied from about one to about 10 parts per hundred parts of monomer (phm.) charged to the system. Preferably, the level of carboxylic emulsifiers ranges from 2 to 6 phm.

Advantageously, small concentration of auxiliary emulsifiers or dispersants can be used with the modified carboxylic emulsifiers. Among the auxiliary emulsifiers or dispersants that can be used, are the anionic polymer type dispersants such as the sodium salts of polymerized alkyl naphthalene sulfonic acid; e.g., Tamol SN, Darvan 1, Daxad 11, Nycol and the like. The concentration of the auxiliary emulsifiers or dispersants is dependent on the nature and the amount of carboxylic emulsifiers present in the emulsion system as well as the monomeric mixture being polymerized and it can vary from about zero to about 1.0 phm. For example, use of about 3.0 phm. of cocyl sarcosine as a primary emulsifier with 0.5 phm. of Tamol SN provides an effective emulsion system for acid polymerization to produce carboxylic latex from a mixture of 49 percent by weight of butadiene, 49 percent by weight of styrene and 2 percent by weight of itaconic acid.

As enumerated above, variations may be made in the monomeric charge, the nature and amounts of carboxylic emulsifiers and auxiliary emulsifiers. Advantageously, the pH of the emulsion polymerization system, which may be varied by the addition of alkaline materials or inorganic acids, provides a critical control or parameter for producing the unique carboxylic latices of the invention. Thus, although carboxylic latices can be produced by emulsion polymerization in aqueous system containing carboxylic emulsifiers and having a substantially neutral pH, the more preferred carboxylic latices, i.e., those containing a substantial proportion of bound acid, are produced in an acidic pH.

In particular, it has been found that the amount of bound acid, i.e., the number of carboxylic acid groups (COOH) within the polymer chain, in the carboxylic latex increases as the pH of the system decreases. In general the amount of bound acid in the carboxylic latex may vary from about 60 to as much as 100% by weight of the carboxyl-containing monomer in the charge at a pH in the vicinity of 2.0 to about 10 to 30% by weight of the charge at a pH of 6 or higher. Because it is desired to have a substantial proportion of bound acid in the carboxylic latex, a pH of 5 or lower is therefore preferred.

In addition to controlling the amount of bound acid, it has been found that the pH of the emulsion system also governs the rate of polymerization of certain monomeric mixtures as well as the level of prefloc. Specifically, our investigations show higher rates of polymerization usually occur in a pH range of from about 2.5 to 5, with the maximum rates often being at a pH of about 3.5 to 5 for the carboxyl-containing diene copolymer. Also the amount of prefloc, although not excessive is increased as the pH drops below about 3.5.

It will be appreciated that optimum polymerization results, e.g. minimum prefloc and maximum bound acid and polymerization rate, are dependent not only on the pH of the system but also on the monomer or monomeric mixtures being polymerized and other components of the polymerization system such as emulsifiers, auxiliary dispersants, electrolytes, water and the like. Thus the optimum ranges specified above are representative of one system and not definitive for all others.

An advantage of the emulsion polymerization system of this invention is that the rate of prefloc deposition or precoagulation of the polymeric solids from the latex can be lowered to an acceptable level when used in commercial size large capacity equipment. Since loss of the polymeric solids as prefloc greatly determines the commercial success of a polymerization system it will be realized that the amount of prefloc is a factor which must always be considered and if possible, kept to a minimum. In accordance with this invention, it has been found that the amount of prefloc can also be kept within acceptable levels by maintaining the emulsion system of this invention at a pH of 5 or below. It will be appreciated that in some instances the pH may be somewhat higher depending on the monomers, carboxylic emulsifiers and the like in the system.

It will be understood that cations are present in the emulsion system either as part of a carboxylic acid soap, a polymerization catalyst, or an alkaline addition used to regulate the pH of the system, i.e., sodium hydroxide, lithium hydroxide, potassium hydroxide, ammonium hydroxide and mixtures thereof.

The polymerization reaction usually is promoted by the addition of free radical yielding initiators such as the alkali persulfates, percarbonates, perborates, and the like; organic peroxides, such as benzoyl peroxide, acetyl peroxide and the like; alkyl peroxides such as di-tert-butyl peroxide; and organic hydroperoxide such as di-isopropyl benzene hydroperoxide. Redox systems of initiation may be employed utilizing the above-mentioned substances with suitable reducing agents well known in the art. The monomeric reaction mixture may also contain small amounts of the sulfhydryl-group-containing compounds termed "modifiers" in the synthetic rubber industry such as alkyl mercaptans containing from about 10 to 22 carbon atoms, for example, n-dodecyl mercaptan, the commercially available mixed tertiary mercaptans containing from 12 to 16 carbon atoms, thiophenol, alpha- or beta-thionaphthol, and the like. The polymerization can be effected within a wide range of temperatures, for example, within the range of from about 0° to about 100° C. and preferably from about 60° to 80° C. Under such conversion conditions, it has been found that high conversions can be obtained and it is the usual practice to continue polymerization until conversions of 80% or more are reached. Conventional short-stopping agents such as hydroquinone, sodium sulfide, tetramethyl thiuram disulfide, or sodium dimethyl dithiocarbamate and the like may be added to the polymerization system to regulate conversion levels.

The amount of water used in the improved polymerization system of this invention may be varied considerably depending on the solids content desired in the resulting latices. In general, from about 100 to 200 parts of water per hundred parts of monomeric mixture are used to produce carboxylic latices having a solids content of from about 35 to as high as 65% by weight.

The unique carboxylic latices of this invention can be characterized as highly stable aqueous dispersions of polymeric solids having a substantial proportion of bound acid in the polymer chain and having a particle size that may range from about 1500 A. to about 5500 A. and usually at least 2500 A. As heretofore described, these latices are acidic in nature. It will be appreciated that these latices can also be readily coagulated by the addition of aqueous solutions of conventional coagulants such as sodium chloride, calcium chloride, calcium nitrate, zinc chloride and the like used alone or mixed with other coagulation aids.

When it is generally quite difficult to prepare stable and fluid carboxylated butadiene-containing latices having greater solids content than about 52%, it has surprisingly been found that latices made in accordance with the invention can be obtained which have a usable viscosity range (i.e. below about 1,000 cp.), and are stable at a solids content as high as 65% by weight. Also these latices have negligible coagulation during stripping.

The latices of this invention are suitable for many varied applications in the paper, paint coating, adhesive and plastic industries. For example, the carboxylic latices may be employed to improve the internal bond strength, wet tensile strength, IGT pick, and the like of non-woven fibrous materials. Thus, the carboxylic latices may be employed to saturate paper after it has already been formed, it may be mixed with paper pulp to improve the properties of the paper produced therefrom, or it may be useful as a coating binder.

In addition the preferred latices may be compounded with pigment, fillers and the like to produce latex paints or vulcanizable coatings, sheetings, films, foams and the like. The latices are particularly effective for preparation of dipping compounded latices used in textile printing and paper coatings, where an adjustable stability and a high solids content latex are often desired. Also they may be employed in other conventional applications of elastomeric latices such as preparation of rubber gloves, girdles, sheeting and the like.

It will also be realized that the carboxylic latices of this invention are compatible with other non-carboxylic latices of butadiene-styrene, butadiene-nitrile, acrylate-nitrile or the like with which the carboxylic latices may be blended to produce coatings, films, layers and the like having many desirable properties.

The following specific examples further illustrate this invention:

Example I

In this example emulsion polymerization was effected in a 5-gallon stirred reactor equipped with an anchor-type agitator operating at low speed, i.e., 120 r.p.m., and a steam heated water jacket.

An aqueous charge consisting of 175 parts of water, 2 parts of itaconic acid, 0.25 part of potassium persulfate and 0.04 part of a 5% aqueous solution of ethylenediaminetetraacetic acid was added to the reactor and agitated until dissolved. Then agitation was stopped, 3 parts of cocoyl sarcosine were added to the reactor and the pH of the aqueous charge was adjusted by addition of ammonium hydroxide to 4.0.

Forty-nine parts of styrene and 0.25 part of Sulfole (trademark), a tert-tridecyl mercaptan modifier, were charged to the reactor followed by the addition of 49 parts of butadiene-1,3. Anchor agitation was then started to provide a homogenous emulsion and the temperature of the reactor was raised to 65° C. After about 17.5 hours the polymerization had reached a conversion of about 94.9 percent, at which time, the agitation was stopped and the unreacted monomers and some of the water present were removed by vacuum stripping. As a result of this polymerization a carboxylic latex having a total solids content of about 35.4% expressed in dry solids based on a total weight of latex was produced. The latex had a bound acid content of 1.1 phr. and a $D\overline{w}$ of 1,600 A. During polymerization, very little prefloc, i.e. about 3% was formed. The pH prior to stripping was adjusted to about 10 to 10.5 by the addition of ammonium hydroxide and a latex having a total solids content of about 55.4% was recovered after stripping.

Example II

Using the general procedure outlined in Example I several additional carboxylic latices were produced from a recipe containing 49 percent by weight butadiene, 49 percent by weight of styrene and 2 percent by weight of itaconic acid using various modified carboxylic emulsifiers at a pH of 7 or below in systems containing from 100 to 175 parts of water. As noted in the following table, high conversions were obtained in each of these polymerizations and all emulsion systems were effective for producing carboxylic latices.

Example I and by successively adjusting the pH of the emulsion system in a series of polymerizations is shown by this example. In these polymerizations ammonium hydroxide was used to neutralize the pH of the system to different levels. The data in the following table show that as the pH of the polymerization increases the amount of bound acid, i.e. free carboxylic acid groups (—COOH) within the latex substantially decreases.

TABLE 1.—EFFECT OF MODIFIED CARBOXYLIC EMULSIFIERS ON POLYMERIZATION OF ACID LATICES

| Emulsifier | | Tamol SN (parts) | Final pH | Prefloc | Conv. (percent) | Bound Acid (phr.) | Dw (A.) |
|---|---|---|---|---|---|---|---|
| Kinds | Parts | | | | | | |
| $NH_4$-cocoyl sarcosinate | a 3.0 | 0.5 | 5.2 | Negl | 97.7 | 0.79 | 3,690 |
| Do | 3.0 | 0.5 | 5.1 | Negl | 97.3 | 0.63 | 3,450 |
| Do | 3.0 | 0.5 | 4.3 | Negl | 98.4 | 0.61 | 2,990 |
| Do | 3.0 | 0.5 | 4.7 | Negl | 100 | 0.73 | 2,470 |
| Do | 3.0 | 0.0 | 4.5 | Negl | 98.2 | 0.77 | 2,550 |
| Do | 4.0 | 0.5 | 4.5 | Negl | 99.5 | 0.40 | 2,650 |
| Do | 3.0 | 0.5 | | Ext. negl | Low | | |
| Do | 3.0 | 0.5 | 4.7 | Ext. negl | 97.3 | 0.49 | 4,800 |
| Do | 3.0 | 0.5 | 4.7 | Ext. negl | 95.4 | 1.0 | 4,030 |
| $NH_4$-lauroylsarcosinate | 3.0 | 0.0 | 5.5 | Ext. negl | 99.4 | 0.20 | 3,680 |
| Do | 3.0 | 0.5 | 5.1 | Ext. negl | 100 | 0.45 | 4,480 |
| $NH_4$-dodecenylsuccinate | 3.0 | 0.0 | | | b 30.9 | | |
| Do | 3.0 | 0.5 | | | b 22.8 | | |
| Nonylphenoxyacetic acid | 3.0 | 0.0 | | Much | c 65.3 | | |
| Do | 3.0 | 0.5 | 4.0 | 10.1 | 94.8 | 0.68 | 3,880 |
| Oleoylsarcosine | 3.0 | 0.5 | 2.4 | 5.65 | 94.6 | 0.86 | 1,440 |
| Cocoylsarcosine | 3.0 | 0.5 | 2.3 | 1.42 | 96.5 | 0.93 | 1,450 |
| Lauroyl sarcosine | 3.0 | 0.5 | 2.3 | 0.81 | 92.8 | 0.98 | 1,470 |
| Partial $NH_4$-oleoylsarcosinate | 3.0 | 0.5 | 4.3 | 0.525 | 93.3 | 0.56 | 1,930 |
| Partial $NH_4$-cocoylsarcosinate | 3.0 | 0.5 | 3.7 | 0.125 | 93.3 | 0.70 | 1,880 |
| Partial $NH_4$-lauroylsarcosinate | 3.0 | 0.5 | 3.8 | 0.310 | 100 | 0.74 | 2,600 | a Monomer ratio of 35/63/2 Bd/St/IA; all others 49/49/2 BD/ST/IA.
b In 74 hours.
c In 117 hours.

Example III

In this example the effect of pH on the emulsion polymerization of a monomeric mixture containing 50 percent butadiene, 48 percent styrene and 2 percent itaconic acid in a cocoyl sarcosine system is illustrated. A series of latices were prepared using 100 parts of the monomeric mixture in an emulsion system containing 175 parts of water, 3.0 parts of cocoyl sarcosine, zero or 0.5 part of Tamol SN, and 0.04 part of ethylenediaminetetraacetic acid. The polymerization reactions were conducted at a temperature of 65° C. at various pH levels; the pH being varied by the addition of ammonium hydroxide. As shown in the following table, high rates of conversion are obtained over a pH range from about 2.3 to 5.2, with the higher rate usually at the lower pH, i.e. about 2.3 to 4.5. It should also be noted that the polymerization rate tends to decrease at the higher pH and that the presence of Tamol SN substantially enhances the polymerization rate.

TABLE 2.—EFFECT OF pH ON POLYMERIZATION

| pH of system | Percent conversion per hour | Tamol SN |
|---|---|---|
| 2.3 | 14.1 | 0.5 |
| 3.7 | 8.4 | 0.5 |
| 4.5 | 5.0 | None |
| 4.7 | 10.0 | 0.5 |
| 5.2 | 2.0 | 0.5 |

Example IV

The effect of pH on the bound acid present in the carboxylic latices by using the latex recipe described in

TABLE 3

Effect of pH on the amount of bound acid in carboxylic latices

| pH of system: | Parts of bound acid based on a charge containing 2 parts of an acid monomer |
|---|---|
| 2.3 | 0.98 |
| 3.8 | 0.74 |
| 5.1 | 0.45 |
| 5.5 | 0.20 |

Emulsifier used was $NH_4$-lauroyl sarcosinate.

Example V

Using the polymerization technique described in Example I several additional latices including carboxylic latices containing substantial amounts of bound acid were prepared from monomers containing alkaline sensitive groups, (e.g., acrylic acid, methacrylic acid, maleic acid, mono-n-butyl itaconate, mono-n-butyl fumarate, monomethyl itaconate and N-methylolacrylamide) in aqueous systems having a pH of 7 or below and containing different modified carboxylic emulsifiers. In each case high conversion levels are obtained in the emulsion polymerization of this invention.

Example VI

This example shows the substantially lower levels of prefloc obtained by using the modified carboxylic emulsifiers in comparation with the prefloc obtained by using carboxylic emulsifiers such as oleic acid and the like in large scale pilot plant systems.

TABLE 4.—COMPARISON OF PILOT PLANT RUNS-ACID CONTAINING TERPOLYMERS IN CARBOXY EMULSIFIED SYSTEMS

| Monomers BD/ST/IA | Carboxylic emulsifier Type | Parts | Tamol SN (Parts) | Percent prefloc | Completion time (hrs.) | Final conv. percent |
|---|---|---|---|---|---|---|
| 50/48/2 | Dres 731 | 2 | 0.75 | 47.5 | 22.0 | 80.0 |
| 50/48/2 | K-Oleate | 2 | 0.30 | 72.5 | 15.0 | 14.0 |
| 50/48/2 | do | a 2.5 | 0.75 | 25.9 | 27.5 | 94.4 |
| 50/48/2 | do | 2.5 | 0.5 | (b) | 22.0 | |
| 50/48/2 | do | 2.5 | 1.0 | (b) | 19.9 | |
| 50/48/2 | Oleic acid | 3.0 | 0.5 | 45.8 | 11.0 | 27.7 |
| 50/48/2 | K-Oleate | 2.5 | 0.75 | 47.5 | 11.5 | 77.8 |
| 50/48/2 | do | 2.5 | 0.75 | 62.5 | 3.5 | 31.6 |
| 50/48/2 | Oleic acid | 3.0 | 0.5 | 100 | 4.0 | 25.6 |
| 50/48/2 | do | 3.0 | 0.5 | 20.9 | 9.5 | 95.0 |
| 50/48/2 | Emery 3101 D c | 2.2 | 0.3 | 100 | 12.0 | 57.7 |
| 50/48/2 | do | 2.2 | 0.3 | 100 | 26.0 | 23.6 |
| 49/49/2 | Partial NH₄-cocyl sarcosinate | 3.0 | 0.5 | 3 | 17.5 | 94.8 |
| 49/49/2 | Partial NH₄-cocyl sarcosine | 3.0 | 0.5 | 8 | 23.5 | 97.0 |
| 49/49/2 | do | 3.0 | (d) | 1 | 38.5 | 90.8 |
| 49/49/2 | do | 3.0 | | 3 | 30.75 | 94.5 | a 0.5 K-Oleate injected at 25-35% conv.
b Complete gel.
c Isostearic acid, a mixture of branched isomers of steric acid by Emery Industries, Cincinnati, Ohio.
d 0.1 part Tamol SN injected at 18 hours to speed up reaction.

From the above data it will be seen that use of the emulsion polymerization system of this invention greatly reduces the amount of prefloc, i.e., from 100% with oleic acid and to as little as 1% or less with cocoyl sarcosine.

Also the data in Table 1 show that prefloc levels well below 1% are obtainable in accordance with this invention.

Example VII

TABLE 5.—EFFECT OF COLLOIDAL VARIATIONS ON MODIFIED CARBOXYLIC-EMULSIFIED METHYLOLATED ACRYLAMIDE-CONTAINING LATICES a

| Cocoyl sarcosine | NH₄ b cocoyl sarcosinate | Polymerization rate, percent per hr. | Final pH | Final conv., percent | Completion time, hrs. | Percent prefloc | Stripped T.S., percent |
|---|---|---|---|---|---|---|---|
| 3.0 | 0.0 | ca. 9 | 4.35 | 92.0 | 22.0 | 0.280 | 57.2 |
| 2.0 | 1.0 | ca. 6 | 5.55 | 92.0 | 22.0 | 1.73 | 49.8 |
| 1.0 | 2.0 | 0.58 | 6–6.5 | 39.8 | 46.5 | | |
| 0.0 | 3.0 | 0.51 | 7.0 | 34.4 | 46.5 | | | a 50/45/5 BD/ST/MOAMD.
b Aqueous solution made with NH₄OH to pH 10.2.

These polymerization results illustrate that more than one carboxylic emulsifier can be used in the same system to produce latices having low prefloc and high solids content. Also the above data clearly show the dependence of the polymerization rate upon pH.

Example VIII

This example further shows production of latices having low viscosities with solids content above 52% by weight of the total weight of the latex. These latices were prepared in the manner outlined in Example I with the amount of emulsifier being varied from 3.0 to 4.0 parts per 100 parts of monomer.

As shown in the following data latices having viscosities as low as 22.5 centpoises were obtained at solids contents as high as 55.5% by weight.

TABLE 6.—VISCOSITY MEASUREMENTS OF MODIFIED CARBOXYLIC-EMULSIFIED CARBOXYL CONTAINING LATICES

| NH₄ cocoyl sarcosinate | Completion time, hrs. | Final conv. | Final pH | Prefloc | Stripped T.S., percent | Viscosity,a cp. | Dw, A. | Phr. Bound acid b |
|---|---|---|---|---|---|---|---|---|
| 3.0 | 34.4 | 100 | 4.7 | Negl | 54.7 | 5.85 | 2,470 | 0.73 |
| 4.0 | 23.7 | 99.5 | 4.5 | Negl | 55.5 | 22.5 | 2,650 | 0.40 | a Parts per 100 parts of rubber solids.
b Brookfield viscosity, using spindle that is appropriate at 12 r.p.m.

It will be understood that many other modifications may be made without departing from the spirit of the invention and that the scope of the invention is not limited to the specification and specific examples set forth herein, but it is to be construed by the appended claims.

What is claimed is:

1. A polymerization system for producing unique stable latices containing a substantial proportion of bound alkaline-sensitive groups therein which comprises an aqueous emulsion containing carboxylic emulsifier modified by the presence of non-cationic hydrophlic group in its hydrocarbon chain, said emulsifier containing at least one carboxylic acid group, and from about 8 to about 40 carbon atoms and being selected from the group consisting of modified fatty acids, modified rosin acids, their partial soaps and mixtures thereof; and polymerizable monomeric material containing at least one aliphatic conjugated diene and at least one copolymerizable monomer having alkaline-sensitive groups selected from the group consisting of carboxylic acid groups, their partial ester derivatives and amidic groups at a pH in a range from about 2 to about 6, said emulsion containing about 100 to about 200 parts of water and from about 1 to about 10 parts of the modified carboxylic emulsifier, said parts being parts by weight per 100 parts by weight of said monomeric material, and said system being capable of supporting emulsion polymerization in large capacity low-shear reactors without the occurrence of excessive prefloc deposition of the resulting polymeric solids.

2. The system of claim 1 in which said aqueous emulsion contains said modified carboxylic emulsifier as the primary emulsifier, and up to about 1 phm. of an anionic polymeric sulfonate surfactant as an auxiliary emulsifier.

3. The system of claim 1 in which said unique latices are carboxylic latices having a substantial proportion of bound acid therein, and said monomeric material comprises a polymerizable monomeric mixture containing from about 0.5 to less than 50% by weight of at least one carboxyl-containing ethylenically unsaturated monomer, from about 10 to about 75% by weight of at least one other ethylenically unsaturated non-carboxylic monomer, copolymerizable with a diene, and the balance consisting of at least one aliphatic conjugated diene.

4. The system of claim 3 in which said carboxyl-containing monomer is selected from the group consisting of ethylenically unsaturated monocarboxylic and polycarboxylic acids and the partial esters of the polycarboxylic acids and monohydric alcohols.

5. The system of claim 3 in which said other non-carboxylic monomer is free of carboxylic acid groups and the partial salts thereof and is selected from the group consisting of monoethylenically unsaturated monomers and mixtures thereof.

6. The system of claim 1 in which said unique latices contain a substantial proportion of alkaline-sensitive amidic groups, and said monomeric material comprises a polymerizable monomeric mixture containing at least one aliphatic conjugated diene and N-methylolacrylamide.

7. The system of claim 1 in which said modified carboxylic emulsifier has the general formula:

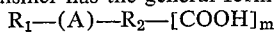

wherein $R_1$ is selected from the group consisting of alkyl, alkaryl, and aralkyl groups containing from 8 to 36 carbon atoms, A is a non-cationic hydrophilic group selected from the group consisting of oxy, thio, amido alkyl, carbamyl, and β-keto groups and alkylene linkages containing hydroxy, siloxy, carboxy, nitrile, aldehyde, or nitro substituent, $R_2$ is selected from the group consisting of an unsubstituted cycloalkylene, arylene group or a $C_{1-4}$ alkylene group which may be linear or branched, and trivalent hydrocarbyl groups derived therefrom and $m$ is an integer from 1 to 2; $R_2$ being a trivalent hydrocarbyl group when $m$ is 2.

8. The system of claim 1 in which the modified carboxylic emulsifier has the general formula:

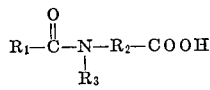

wherein $R_1$ is selected from the group consisting of alkyl, alkaryl and aralkyl groups containing from 8 to 36 carbon atoms, $R_2$ is selected from the group consisting of an unsubstituted cycloalkylene, arylene or a $C_{1-4}$ alkylene group which may be linear or branched, and $R_3$ is selected from the group consisting of hydrogen and alkyl and alkaryl groups containing from 1 to 20 carbon atoms.

9. The system of claim 1 in which the modified carboxylic emulsifier has the following general formula:

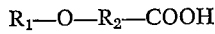

wherein $R_1$ is selected from the group consisting of alkyl, alkaryl, and aralkyl groups containing from 8 to 36 carbon atoms and $R_2$ is selected from the group consisting of an unsubstituted cycloalkylene, arylene or a $C_{1-4}$ alkylene group which may be linear or branched.

10. The system of claim 1 in which the modified carboxylic emulfier has the general formula:

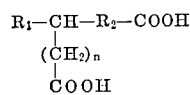

wherein $R_1$ is selected from the group consisting of alkyl, alkaryl, and aralkyl groups containing from 8 to 36 carbon atoms, $R_2$ is selected from the group consisting of an unsubstituted cycloalkylene, arylene or a $C_{1-4}$ alkylene group which may be linear or branched, and $n$ is an integer from 1 to 4.

11. A process for producing unique stable latices containing a substantial proportion of bound alkaline-sensitive groups which comprises effecting polymerization of polymerizable monomeric material containing at least one aliphatic conjugated diene and at least one copolymerizable monomer having alkaline-sensitive groups selected from the group consisting of carboxylic acid groups, their partial ester derivatives and amidic groups in an aqueous emulsion containing a carboxylic emulsifier modified by the presence of a non-cationic hydrophilic group in its hydrocarbon chain, said emulsifier containing at least one carboxylic acid group, and from about 8 to about 40 carbon atoms, and being selected from the group consisting of modified fatty acids, modified rosin acids, their partial soaps and mixtures thereof, at a pH in a range from about 2 to about 6, said aqueous emulsion containing about 100 to about 200 parts of water, and from about 1 to about 10 parts of the modified carboxylic emulfier, said parts being parts by weight per 100 parts by weight of said monomeric material, and said emulsion being capable of supporting emulsion polymerization in low-shear large capacity reactors without the occurrence of excessive prefloc deposition of the resulting polymeric solids.

12. The process of claim 11 in which said aqueous emulsion contains the modified carboxylic emulsifier as the primary emulsifier, and up to about 1 phm. of an anionic polymeric sulfonate surfactant as an auxiliary emulsifier.

13. The process of claim 11 in which said unique latices are carboxylic latices having a substantial proportion of bound acid therein, and said monomeric material comprises a polymerizable monomeric mixture containing from about 0.5 to less than 50% by weight of at least one carboxyl-containing unsaturated monomer, from about 10 to about 75% by weight of at least one other ethylenically unsaturated non-carboxylic monomer copolymerizable with a diene, and the balance consisting of at least one aliphatic conjugated diene.

14. The process of claim 13 in which said carboxyl-containing monomer is selected from the group consisting of ethylenically unsaturated monocarboxylic and polycarboxylic acid and the partial esters of the polycarboxylic acids and monohydric alcohols.

15. The process of claim 11 in which said modified carboxylic emulsifier has the general formula:

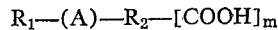

wherein $R_1$ is selected from the group consisting of alkyl, alkaryl, and aralkyl groups containing from 8 to 36 carbon atoms, A is a non-cationic hydrophilic group selected from the group consisting of oxy, thio, amido alkyl, carbamyl, and β-keto groups and alkylene linkages containing hydroxy, siloxy, carboxy, nitrile, aldehyde or nitro substituent, $R_2$ is selected from the group consisting of an unsubstituted cycloalkylene, arylene group or a $C_{1-4}$ alkylene group which may be linear or branched, and trivalent hydrocarbyl groups derived therefrom and $m$ is an integer from 1 to 2; $R_2$ being a trivalent hydrocarbyl group when $m$ is 2.

16. The process of claim 11 in which the modified carboxylic emulsifier has the general formula:

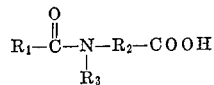

wherein $R_1$ is selected from the group consisting of alkyl, alkaryl and aralkyl groups containing from 8 to 36 carbon atoms, $R_2$ is selected from the group consisting of an unsubstituted cycloalkylene, arylene or a $C_{1-4}$ alkylene group which may be linear or branched, and $R_3$ is selected from the group consisting of hydrogen and alkyl and alkaryl groups containing from 1 to 20 carbon atoms.

17. The process of claim 11 in which the modified carboxylic emulsifier has the general formula:

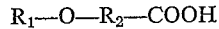

wherein $R_1$ is selected from the group consisting of alkyl, alkaryl and aralkyl groups containing from 8 to 36 carbon atoms and $R_2$ is selected from the group consisting of an unsubstituted cycloalkylene, arylene or a $C_{1-4}$ alkylene group which may be linear or branched.

18. The process of claim 11 in which the modified carboxylic emulsifier has the general formula:

$$R_1\text{---}CH\text{---}R_2\text{---}COOH$$
$$|$$
$$(CH_2)_n$$
$$|$$
$$COOH$$

wherein $R_1$ is selected from the group consisting of alkyl, alkaryl and aralkyl groups containing from 8 to 36 carbon atoms, $R_2$ is selected from the group consisting of an unsubstituted cycloalkylene, arylene or a $C_{1-4}$ alkylene group which may be linear or branched, an $n$ is an integer from 1 to 4.

19. The process of claim 11 in which said unique latices contain substantial proportions of amidic alkaline-sensitive groups, and said monomeric material comprises a polymerizable monomeric mixture containing at least one aliphatic conjugated diene and N-methylolacrylamide.

20. A unique stable latex containing a substantial proportion of bound alkaline-sensitive groups which comprises a stable aqueous dispersion of polymeric solids prepared by polymerization of a polymerizable monomeric material containing at least one aliphatic conjugated diene and at least one copolymerizable monomer having alkaline-sensitive groups selected from the group consisting of carboxylic acid groups, their partial esters, and amidic groups, in an aqueous emulsion containing from about 100 to about 200 parts of water and from about 1 to about 10 parts of a carboxylic emulsifier modified by the presence of a non-cationic hydrophilic group in its hydrocarbon chain, said emulsifier containing at least one carboxylic acid group and from 8 to 40 carbon atoms and being selected from the group consisting of modified fatty acids, modified rosin acids, their partial soaps and mixtures thereof, and having a pH in a range from about 2 to about 6; said parts being parts by weight per 100 parts by weight of said monomeric material.

21. The latex of claim 20 in which said latex comprises a carboxylic-diene latex capable of producing films and the like that has useful viscosity at high solids content and that has a substantial proportion of bound acid therein, and said monomeric material comprising a mixture containing from about 0.5 to about 20% by weight of at least one carboxyl-containing monomer, from about 10 to about 90% by weight of at least one aliphatic conjugated diene and from 10 to 75% by weight of at least one other ethylenically unsaturated non-carboxylic monomer.

22. The latex of claim 21 in which said carboxyl-containing monomer is selected from the group consisting of ethylenically unsaturated monocarboxylic and polycarboxylic acids and the partial esters of the polycarboxylic acids and monohydric alcohols.

23. The latex of claim 21 in which the non-carboxylic monomer is a monomer free of carboxylic acid groups and the salts thereof and is selected from the group consisting of monoethylenically unsaturated monomers and mixtures thereof.

24. The latex of claim 20 in which said latext comprises an amide-containing diene latex that contains substantial proportions of amide groups bound therein, and said monomeric material comprising a mixture containing at least one aliphatic conjugated diene and N-methylolacrylamide.

25. The latex of claim 20 in which said modified carboxylic emulsifier has the general formula:

$$R_1\text{---}(A)\text{---}R_2\text{---}[COOH]_m$$

wherein $R_1$ is selected from the group consisting of alkyl, alkaryl and aralkyl groups containing from 8 to 36 carbon atoms, A is a non-cationic hydrophilic group selected from the group consisting of oxy, thio, amido alkyl, carbamyl, and $\beta$-keto groups and alkylene linkages containing hydroxy, siloxy, carboxy, nitrile, aldehyde, or nitro substituent, $R_2$ is selected from the group consisting of an unsubstituted cycloalkylene, arylene group or a $C_{1-4}$ alkylene group which may be linear or branched, and trivalent hydrocarbyl groups derived therefrom and $m$ is an integer from 1 to 2; $R_2$ being a trivalent hydrocarbyl group when $m$ is 2.

References Cited

UNITED STATES PATENTS

| | | | |
|---|---|---|---|
| 2,227,517 | 1/1941 | Starkweather et al. | 260—92.3 |
| 2,684,954 | 7/1954 | Miller | 260—29.7 |
| 2,724,707 | 11/1955 | Brown | 260—80.7 |
| 2,939,855 | 6/1960 | Bartl et al. | 260—29.7 |
| 2,981,721 | 4/1961 | Brown | 260—80.7 |
| 3,385,728 | 5/1968 | Walsh | 117—161 |

OTHER REFERENCES

Becher, "Emulsions: Theory and Practice," 1957, p. 362, TP 156 E6 B4 C2.

Speel, "Textile Chemicals and Auxiliaries," 1952, p. 310, TS 1449 S64 C2.

HOSEA E. TAYLOR, Primary Examiner

R. A. WHITE, Assistant Examiner

U.S. Cl. X.R.

117—155, 161, 163; 260—27, 29.7

UNITED STATES PATENT OFFICE
CERTIFICATE OF CORRECTION

Patent No. 3,591,541         Dated July 6, 1971

Inventor(s)   Robert D. Athey et al.

It is certified that error appears in the above-identified patent and that said Letters Patent are hereby corrected as shown below:

Columns 13 and 14, Table 6, line 7, should appear as shown below:

[a] Brookfield viscosity, using spindle that is appropriate at 12 r.p.m.

same table line 8, should appear as shown below:

[b] Parts per 100 parts of rubber solids.

Signed and sealed this 23rd day of May 1972.

(SEAL)
Attest:

EDWARD M. FLETCHER, JR.
Attesting Officer

ROBERT GOTTSCHALK
Commissioner of Patents